July 18, 1933.  C. A. CAMPBELL  1,918,632
AIR BRAKE
Filed July 27, 1932   3 Sheets-Sheet 1

Inventor
Charles A. Campbell
By
Dodge ...
Attorneys

July 18, 1933. C. A. CAMPBELL 1,918,632
AIR BRAKE
Filed July 27, 1932 3 Sheets-Sheet 2
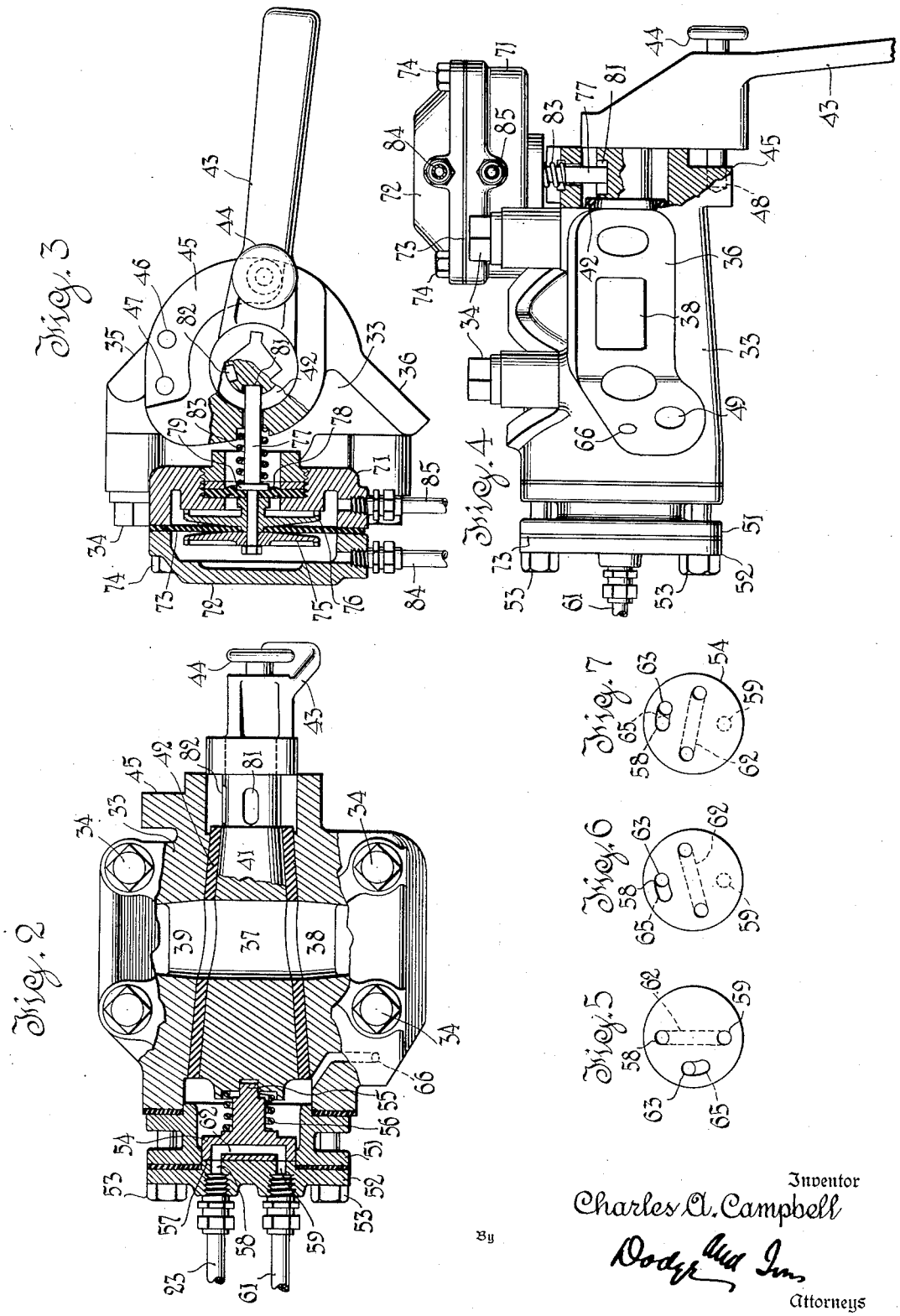
Inventor
Charles A. Campbell
Dodge and Im
Attorneys

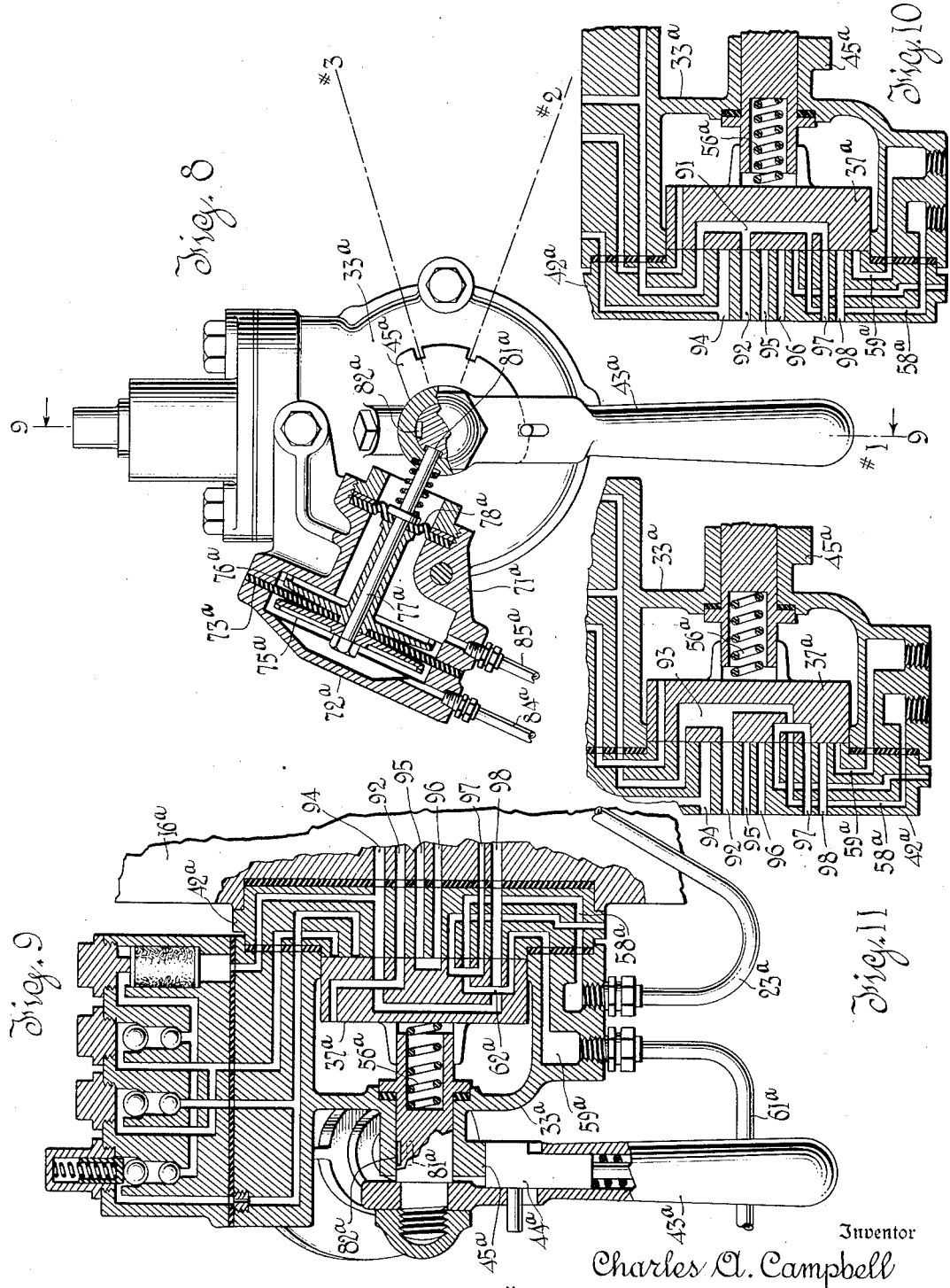

Patented July 18, 1933

1,918,632

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AIR BRAKE

Application filed July 27, 1932. Serial No. 625,097.

This invention relates to automatic air brakes and particularly to automatic air brakes in combination with automatic train control mechanisms.

In certain train control mechanisms, particularly those which have their brake applying element acting upon or closely associated with the engineer's brake valve, it is possible to forestall an application by manipulating the double heading cock which customarily is interposed between the engineer's brake valve and the brake pipe. It is essential that it be possible to manipulate this cock at any time because it has characteristically different positions on a leading locomotive and on the second locomotive of a double-header. Furthermore, if of the three-position type, it must be set in still a third position on an engine hauled dead in a train.

The purpose of the present invention is to leave this cock free for manipulation under all proper conditions, and to lock it against manipulation for the purpose of forestalling brake applications.

In its broadest aspect the invention contemplates the use of a pressure actuated mechanism which protects the double-heading cock against manipulation unless the brake pipe pressure is reduced sufficiently to produce an application.

In its more refined aspects the invention contemplates that the protecting mechanism will permit manipulation only when the brake pipe pressure is reduced beyond the point which will produce a full service brake application, or what is known in the art as a full equalized application.

To accomplish this result the protecting mechanism is actuated by the opposing pressures in the brake pipe and in the pressure chamber of the distributing valve customarily used on locomotives, the pressure chamber being analogous to an auxiliary reservoir.

In addition, the double-heading cock is so contrived that either through an associated valve or through ports formed in the double-heading valve itself, it will serve to isolate the application valve in positions 2 and 3 and then subject the application valve to such pressure as is necessary to maintain it inactive.

In order to develop the full possibilities of the invention, it will be described as embodied in two different forms of three position double-heading cock and applied to a double end unit.

In the drawings,—

Fig. 2 is an axial section through a three position double-heading cock and a related rotary valve, the parts being shown in position 1.

Fig. 3 is an end elevation of the valve shown in Fig. 2 with parts broken away to show the internal construction of the latch motor.

Fig. 4 is a side elevation of the valve shown in Figs. 2 and 3, looking toward one of two related bolting faces. Certain parts are broken away to show the latching mechanism.

Fig. 5 is a face view of the related valve in position 1, with the relative positions of the seat ports indicated.

Fig. 6 is a similar view thereof in position 2.

Fig. 7 is a similar view thereof in position 3.

Fig. 8 is an end elevation of a double-heading valve of the rotary disk type showing the latching mechanism in axial section. The valve is illustrated in position 1.

Fig. 9 is a section on the line 9—9 of Fig. 8.

Fig. 10 is a reversed fragmentary view similar to Fig. 9, showing the valve in position 2.

Fig. 11 is a view similar to Fig. 10 showing the valve in position 3.

Figure 1:
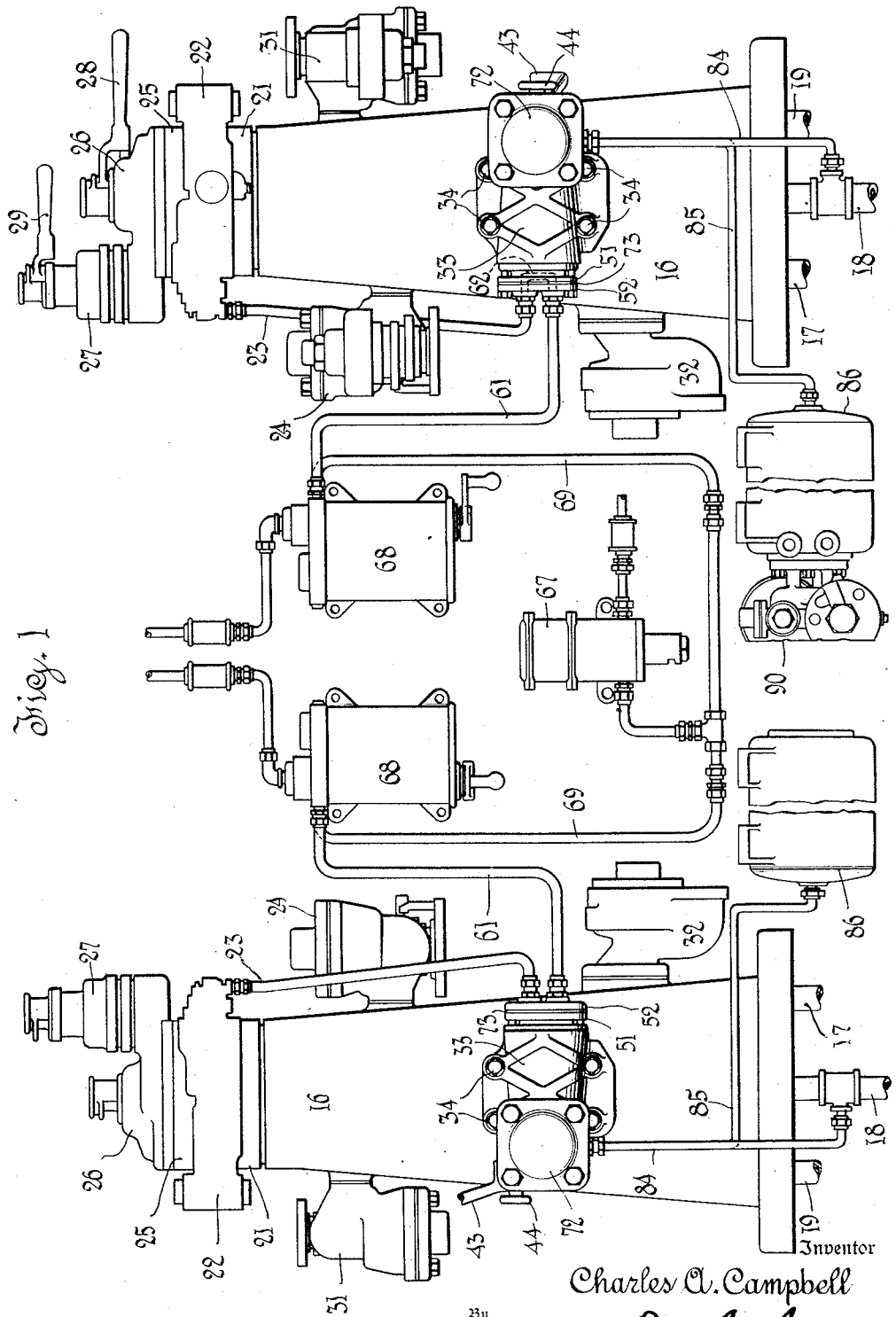
Fig. 1 is a diagrammatic layout of the essential parts of the equipment for a single double-ended locomotive.

In Figs. 9, 10 and 11 the ports are diagrammatically illustrated as if they all lay in a single plane, the purpose being to permit the various flows to be traced in a single view. In actual practice the ports are somewhat differently located.

With the exception of the electro-pneumatic valve hereinafter described, the mechanism at the two ends of the locomotive is duplicated. To simplify the description the mechanism at only one end will be described, and that at the opposite end will be given similar reference numerals.

A brake pedestal is shown at 16 and is provided with the usual connections, 17 leading to the main reservoir, 18 leading to the brake pipe, and 19, which is the double heading cock seating pipe, and is also connected with the main reservoir. Mounted on the pedestal 16 is the customary equalizing discharge portion 21 of an engineer's brake valve. Mounted on the portion 21 is an application valve 22, here indicated as of the type developed by the General Railway Signal Company. This valve is illustrated merely as typical. It includes a piston against which main reservoir pressure is at times admitted through a pipe 23. When the piston is under pressure the application valve is inactive. When air is vented from pipe 23 the application valve shifts to cut off the supply of air to the brake pipe 18 through the feed valve 24 and to discharge air from the equalizing reservoir. The discharge of air from the equalizing reservoir lowers the pressure in that reservoir and causes the usual equalizing discharge piston to rise and discharge air from the brake pipe to produce an application of the brakes.

The train stop mechanism operates to cause an application by discharging air through the pipe 23 from the application valve and the application valve functions to vent the equalizing reservoir at a moderate rate so that the brakes are gradually applied.

The mechanism just mentioned is familiar to those skilled in the art. Its exact form is immaterial so that the general description given is believed to be sufficient.

The seat for the rotary valve is formed on a portion 25 which is mounted upon the application valve 22. A cap 26 houses the rotary valve of the engineer's brake valve and is formed with a supporting extension for the independent brake valve which is indicated by the numeral 27 applied to its cap.

In Fig. 1 the engine is supposed to be proceeding to the right, so that the brake valve handles are in place on the right hand end. Only one set of handles is used for a locomotive. The handle for the engineer's brake valve is indicated at 28 and the handle for the independent valve is indicated at 29.

31 represents a pressure reducing valve which feeds air to the signal system and independent brake valve 27, while 32 represents an emergency relay valve which functions in emergency position of the engineer's brake valve to vent the brake pipe directly to atmosphere. These are familiar components.

A double-heading cock is indicated by the numeral 33 applied to its body. It is of the plug type, and in the embodiment illustrated is mounted on the pedestal 16 by means of studs and nuts 34. In conformity with conventional construction the valve is formed with two mounting faces 35 and 36 at an angle to each other and adapted to mate with a V-shaped recess formed in the pedestal. This construction conforms to present standards and the details are not material to the present invention.

The cock is provided with a through port 37, which in position 1 of the cock, connects the passage 38 leading to the brake pipe with the passage 39 leading to the brake pipe passage of the engineer's brake valve. The cock plug 41 turns in the usual bushing 42 and is manipulated by a handle 43 fixed on its smaller end. The handle 43 carries a manually actuated latch 44 which is spring urged into positioning holes formed in a sector 45. Two of these holes are visible at 46 and 47 in Fig. 3, and define positions 2 and 3 respectively. The hole which defines position 1 is indicated at 48 in Fig. 4.

Besides controlling the brake pipe connection the plug cock may control a number of ports such as the transfer valve port 49, signal ports, and the like, but these are not material to the invention and are not illustrated in detail. Mounted on the end of the body 33 remote from section 45, is an annular supplemental body 51 which receives a cap 52. The joints between the parts are sealed with gaskets, as shown, and the parts are held in assembled relation and connected with body 33 by machine screws 53. The cap 52 is formed with a seat for a rotary valve 54 which has a cross key connection 55 with the plug 41. Thus the plug 41 and the valve 54 turn together but are free to move longitudinally independently of each other. They are forced apart by a coiled compression spring 56 confined between them. This urges the plug 41 into sealing engagement with the bushing 42 and urges the valve 54 against the seat 57 formed on the cap 52. The seat 57 is provided with two diametrically opposed ports, the upper one of which, 58, communicates directly with the pipe 23 which leads to the application valve 22. The lower port 59 is connected with the pipe 61.

The rotary valve is provided with a port 62 which, in position 1 of the double-heading cock, connects the ports 58 and 59 (see Figs. 2 and 5). The port 62 moves out of register in positions 2 and 3 (Figs. 6 and 7) so that in such positions the ports 58 and 59 are disconnected. In these positions the port 59 is blanked by the valve 54 but in each of them the port 58 is exposed by means of a port 63 which is drilled through the valve 54 and has an extension groove 65 on the face of the valve. The length of this groove is such as to maintain communication with the port 63 in both positions 2 and 3.

A port 66 formed in the body 33 communicates with the double heading cock seating pipe 19 and thus rejects the space between the cock 41 and the valve 54 to main reservoir pressure. This not only urges the valves toward their seats but supplies pressure fluid which, passing through the ports 63 and 58 in both positions 2 and 3, flows to the application valve through pipe 23 and holds the application valve in its normal or inactive position.

Position 2 is the position used on the rear end of the leading locomotive, and on both ends of the second locomotive in a double-headed train. Position 2 is used on the rear end and position 3 on the forward end of a double-ended locomotive hauled dead in a train. In position 3 the brake pipe charges the main reservoir on the dead locomotive, during release, so that the brakes on the dead locomotive are at least partially effective.

The pipe 61 might lead directly to the electropneumatic valve (commonly called the E. P. V.) 67 which is the device which responds to produce a brake application automatically under certain circumstances, for example, when the engineer passes a signal set against him, as is well understood in the train control art. Instead, however, of providing a direct connection between the pipe 61 and the E. P. V. 67 I prefer to make the connection through a valve forming part of the directional switch 68. In doing so I follow a practice established in the art, according to which it is customary to connect the application valve 22 to the E. P. V. 67 through such valve.

The directional switch 68 contains manually controlled means for shutting off the motive power from the locomotive, and also for actuating the valve just mentioned, which is interposed between the pipes 61 and 69.

The directional switch has three positions, "on", "off" and "reset". In the "on" position of the directional switch, the valve connects the pipes 61 and 69. In the "off" position, and in the "reset" position, it disconnects these pipes and vents the pipe 61 to atmosphere. It follows that if the directional switch be shifted from "on" position to either "off" or "reset" position, while the double heading cock 41 is in position 1, a brake application will ensue, and this fact is relied upon to remind the operator to adjust the double heading cock, since he can not release the application otherwise. The application so made serves to release the latch mechanism shortly to be described. Motion of the double heading cock to position 2 restores the application valve, and the ensuing rise of brake pipe pressure locks the double heading cock.

The parts so far described, with the exception of the auxiliary rotary valve 54 and its housing, will be recognized as conforming to standard practice.

Mounted on the body 33 is a latch motor made up of a body 71 and a cap 72, with an intervening flexible diaphragm 73 clamped between them. The body 71 and cap 72 are connected by machine screws 74. The diaphragm 73 carries at its center two convex disks 75 and 76 which act as thrust members and which also coact with the body 71 and cap 72 to limit the motions of the diaphragm. A latch stem 77 extends through the members 75 and 76 to clamp them together upon the center of the diaphragm, and also passes through the center of a small flexible diaphragm 78, clamping it between a flange 79 on the stem 77 and a portion of the member 76. The diaphragm 78 is much smaller than the diaphragm 73 in its effective area, and permits the elimination of a packed joint.

The stem 77 is guided in a hole formed in a portion of the sector 45 and may engage in either of two latching recesses 81 and 82 formed in the stem of the plug 41. These are so located that the latch member 77 will lock the valve 41 in either position 1 or position 2. It is not believed essential to provide a recess to latch the parts in position 3 since this position is used only on a dead locomotive.

Spring 83 urges the latch stem 77 in a releasing direction. The space within the cap 72 is connected by pipe 84 with the brake pipe 18. The space at the other side of the diaphragm within the body 71 is connected by pipe 85 with the pressure chamber 86 of the distributing valve 90 customarily used on locomotives. This valve may be of the well known ET or LT type.

Normally brake pipe pressure and the pressure in the pressure chamber are equal, but because of the use of the small diaphragm 78 the effective area subject to brake pipe pressure is larger and brake pipe pressure predominates to hold the latch 77 in engagement, despite the action of the spring 83. As brake pipe pressure is reduced, the pressure in the pressure chamber will be correspondingly reduced and balance between the two pressures will be approximately maintained until the point of "full equalization" is reached. If the brake pipe pressure be reduced further, it will then drop below the pressure in the pressure chamber sufficiently to cause the diaphragm 73 to draw the latch pin 77 clear, thus freeing the double-heading cock.

The strength of the spring 83 is less than the unbalancing effect of the diaphragm 78 when the system is under pressure, but when the system is not under pressure the spring 83 will function to disengage the latch 77, thus freeing the double-heading cock.

In Figs. 8 to 11 there is illustrated the application of the above latching mechanism to a double-heading cock of the rotary disk type, such as is described and claimed in my copending application Serial No. 561,288, filed September 4, 1931. In this construction a seat member 42a is mounted against the pedestal 16a and receives a cap structure 33a. The rotary disk valve is indicated at 37a and is returned by handle 43a having a manually actuated latch 44a. The valve is held seated by a coil spring 56a. There is a secondary latch mechanism which is essentially identical with that shown in Figs. 1 to 4 inclusive, and in which the parts are similarly numbered with the subscript "a".

The valve is shown in position 1, in Fig. 9, in position 2, in Fig. 10, and in position 3 in Fig. 11. It is provided with ports which perform the same function as the ports in the rotary valve 54 shown in Fig. 2. It will be observed that the pipe 23a, which is the pipe connecting the application valve, leads to a passage 58a in the seat 42a, and the pipe 61a, which leads to the directional switch, connects with the passage 59a also leading through the seat 42a.

In position 1, a loop port 62a, formed in the rotary valve 37a, connects the ports 58a and 59a so that in position 1, as before, the application valve is connected through the directional switch to the E. P. V.

In positions 2 and 3, port 59a is blanked by the rotary valve 37a. In position 2, Fig. 10, the port 58a is connected directly by a port 91 in the rotary valve 37a with the main reservoir port 92, while in position 3, Fig. 11, port 58a is connected with the main reservoir port 92 by port 93 in the valve 37a.

In order that the valve illustrated in Figs. 8, 9 and 10, may be recognized as capable of performing the functions of a double-heading cock, I may mention that the port 94 is the brake pipe port, that the ports 95 and 96 are interposed in the signal system, that the port 97 leads to the transfer valve (not shown) and that the port 98 leads to the brake pipe port in the engineer's brake valve.

No claim is here made to the construction of the rotary disk double-heading cock illustrated in Figs. 8 to 11, as this forms the subject matter of the prior application above identified. The purpose of illustrating the valve in the present application is to show the possibility of combining all the functions of the valves 37 and 54, of Figs. 1 to 7, in a single valve structure, and particularly, the possibility of combining them in a single valve of the rotary disk type.

The mechanism described with reference to Figs. 8 to 11, functions in identically the same manner as does the structure of Figs. 1 to 7, so far as the functions of the latching mechanism are concerned.

Both embodiments of the invention above described are characterized by the use of a latch or bolt to fix the double heading cock against undesired manipulation. While I regard this as the best and simplest mechanism, I am aware that undesired manipulation of the handle of a cock or similar device can be prevented by means which do not respond strictly to the term "latch" and I regard the substitution of such means for the latch disclosed in this application as falling within the scope of the present invention.

What is claimed is,—

1. The combination of a brake pipe; an engineer's brake valve provided with automatic train control mechanism; a double heading cock interposed between said brake valve and pipe; and means subject to brake pipe pressure and serving to prevent manipulation of said cock when brake pipe pressure is at its normal or running value.

2. The combination of a brake pipe; an engineer's brake valve provided with automatic train control mechanism; a double heading cock interposed between said brake valve and pipe; a reservoir charged under running conditions, and serving in conjunction with brake pipe pressure to control application of a brake; normally active means serving to prevent manipulation of said double heading cock; and means subject to the pressures in said brake pipe and reservoir and serving to render inactive said normally active means when said pressures are such as to ensure an application of the brakes.

3. The combination of a brake pipe; an engineer's brake valve provided with automatic train control mechanism; a double heading cock interposed between said brake valve and pipe; a reservoir charged under running conditions, and serving in conjunction with brake pipe pressure to control application of a brake; normally active means serving to prevent manipulation of said double heading cock; and means subject to the pressures in said brake pipe and reservoir and serving to render inactive said normally active means when said pressures are such as to ensure a full equalized application of the brakes.

4. The combination of a brake pipe; an engineer's brake valve provided with automatic train control mechanism; a double heading cock interposed between said brake valve and pipe; a reservoir charged under running conditions, and serving in conjunction with brake pipe pressure to control application of a brake; normally active means serving to prevent manipulation of said double heading cock; means subject to the pressures in said brake pipe and reservoir and serving to render inactive said normally active means when said pressures are such as to ensure an application of the brakes; and means, serving when said reservoir and brake pipe are free of pressure, to render said normally active means inactive.

5. The combination of a brake pipe; an engineer's brake valve provided with automatic train control mechanism; a double heading cock interposed between said brake valve and pipe; a distributing valve including a pressure chamber; a latch controlling manipulation of said double heading cock; and a pressure motor subject to brake pipe and pressure chamber pressures and arranged to engage said latch under brake releasing conditions and disengage the same under a brake applying condition.

6. The combination of a brake pipe; an engineer's brake valve provided with automatic train control mechanism; a double heading cock interposed between said brake valve and pipe; a distributing valve including a pressure chamber; a latch controlling manipulation of said double heading cock; a pressure motor subject to brake pipe and pressure chamber pressures and arranged to engage said latch under brake releasing conditions and disengage the same under a brake applying condition; and means for disengaging said latch when said pipe and chamber are free of pressure.

7. The combination of a brake pipe; an engineer's brake valve; associated pressure controlled brake applying means; automatic means for controlling the pressure on said pressure controlled means; a double heading cock interposed between said brake pipe and said brake applying means; and means responsive to brake pipe pressure and serving to prevent manipulation of said cock when brake pipe pressure is at its normal or running value.

8. The combination of a brake pipe; an engineer's brake valve; associated pressure controlled brake applying means; automatic means for controlling the pressure on said pressure controlled means; a double heading cock interposed between said brake pipe and brake valve; means subject to brake pipe pressure and serving to prevent manipulation of said cock when brake pipe pressure is at its normal or running value; and means operated simultaneously with said double heading cock for disconnecting said automatic means from said brake applying means and establishing on said brake applying means a controlling pressure which will maintain the same inactive while said double heading cock is in closed position.

9. The combination of a brake pipe; an engineer's brake valve; associated pressure controlled brake applying means; automatic means for regulating the pressure on said pressure controlled means; a double heading cock interposed between said brake pipe and brake valve; a reservoir charged under running londitions and serving in conjunction with brake pipe pressure to control application of a brake; normally active means serving to prevent manipulation of said double heading cock; means subject to the pressures in said brake pipe and reservoir and serving to render inactive said normally active means when said pressures are such as to ensure an application of the brakes; and valve means operated simultaneously with said double heading cock and effective when said double heading cock is in closed position to disconnect said automatic means from said brake applying means and subject said brake applying means to a controlling pressure which will render it inert.

10. The combination of a brake pipe; an engineer's brake valve; associated pressure controlled brake applying means; automatic means for regulating the pressure on said pressure controlled means; a double heading cock interposed between said brake pipe and brake valve; a reservoir charged under running conditions and serving in conjunction with brake pipe pressure to control application of a brake; normally active means serving to prevent manipulation of said double heading cock; means subject to pressures in said brake pipe and reservoir and serving to render inactive said normally active means when said pressures are such as to ensure an application of the brakes; valve means operated simultaneously with said double heading cock and effective when said double heading cock is in closed position to disconnect said automatic means from said brake applying means and subject said brake applying means to a controlling pressure which will render it inert; and means serving when said reservoir and brake pipe are free of pressure to render said normally active means inactive.

11. The combination of a brake pipe; an engineer's brake valve; associated pressure controlled brake applying means; automatic means for controlling the pressure on said brake applying means; a double heading cock interposed between said brake valve and brake pipe; valve means operated simultaneously with said double heading cock and serving when said cock is in closed position to disconnect said automatic means from said brake applying means and subject said brake applying means to a controlling pressure which will render the same inert; a distributing valve including a pressure chamber; means shiftable to prevent or permit manipulation of said double heading cock; and a pressure motor subject to brake pipe and pressure chamber pressures and arranged to shift the last named means to prevent manipulation under brake releasing conditions and permit manipulation under brake applying conditions.

12. The combination of a brake pipe; an engineer's brake valve; associated pressure controlled brake applying means; automatic means for controlling the pressure on said brake applying means; a double heading cock interposed between said brake valve and brake pipe; valve means operated simultaneously with said double heading cock and serving when said cock is in closed position to disconnect said automatic means from said brake applying means and subject said brake applying means to a controlling pressure which will render the same inert; a distributing valve including a pressure chamber; a latch controlling manipulation of said double heading cock; a pressure motor subject to brake pipe and pressure chamber pressures and arranged to engage said latch under brake releasing conditions, and to disengage the same under brake applying conditions; and means for disengaging said latch when said pipe and chamber are free of pressure.

13. The combination with a brake system including a brake pipe, a distributing valve and a double heading cock, of means for controlling the manipulation of the double heading cock, comprising a positive latch; and means subject to brake pipe pressure and the opposing pressure in the pressure chamber of the distributing valve, and serving to hold said latch engaged unless brake pipe pressure be reduced beyond the point of full service application of the brakes.

14. The combination of a brake pipe; an application valve connected therewith; automatic actuating means normally connected with said application valve; a double heading cock controlling the connection between said application valve and said brake pipe; and means associated with said double heading cock and serving to disconnect said application valve from said actuating means and render the same inert when said double heading cock is closed.

15. The combination with the structure defined in claim 14, of normally engaged means serving to protect said double heading cock against manipulation, said means including a motor subject to brake pipe pressure and effective to disengage said means when said brake pipe pressure is reduced to cause a brake application.

16. The combination with the structure defined in claim 14, of normally engaged latching means serving to lock said double heading cock against manipulation, said means including a motor subject to brake pipe pressure and effective to disengage said latch when said brake pipe pressure is reduced to cause a brake application; and a spring effective to disengage said latch when the brake system is discharged and ineffective to disengage the latch when the system is charged.

17. The combination of claim 14, further characterized in that the application valve is pressure controlled and the means associated with the double heading cock comprises a valve connected to turn with the double heading cock and controlling a pressure connection between the application valve and the automatic actuating means.

18. The combination of claim 14, further characterized in that the application valve is pressure controlled, and the means associated with the double heading cock comprises ports in said cock which control the pressure connection between the application valve and the automatic actuating means.

19. The combination of claim 14, further characterized in that the application valve is pressure controlled, and the means associated with the double heading cock comprises ports in said cock which when the cock is open establish the controlling pressure connection between the application valve and the automatic actuating means, and when the cock is closed interrupt such connection, and subject the application valve to a controlling pressure which renders it inert.

20. The combination of claim 14, further characterized in that the double heading cock is of the three-position disk type, the application valve is of the pressure controlled type, and the means associated with the double heading cock comprises ports in said cock, which when the cock is open establish the controlling pressure connection between the application valve and the automatic actuating means, and when the cock is closed interrupt such connection.

21. The combination of claim 14, further characterized in that the double heading cock is of the three-position disk type, the application valve is of the pressure controlled type, and the means associated with the double heading cock comprises ports in said cock, which when the cock is open establish the controlling pressure connection between the application valve and the automatic actuating means, and when the cock is closed interrupt such connection and subject the application valve to a controlling pressure which renders it inert.

22. The combination of a brake pipe; an application valve of the pressure controlled type connected therewith; automatic actuating means for establishing the controlling pressure on said application valve; a double heading cock of the three position disk type controlling the connection between the application valve and brake pipe and the connection between automatic actuating means and the application valve and serving to open and close the same substantially simultaneously; and pressure actuated means responsive in part to brake pipe pressure, and serving to prevent manipulation of said cock between open and closed position while the brakes are released.

23. The combination of a brake pipe; an application valve of the pressure controlled type connected therewith; automatic actuating means for establishing the controlling pressure on said application valve; a double heading cock of the three position disk type controlling the connection between the application valve and brake pipe and the connection between automatic actuating means and the application valve and serving to open and close the same substantially simultaneously and when closed serving to admit a controlling pressure to render said application valve inert; and pressure actuated means responsive in part to brake pipe pressure, and serving to prevent manipulation of said cock between open and closed position while the brakes are released.

24. The combination of a brake pipe; an application valve of the pressure controlled type connected therewith; automatic actuating means for establishing the controlling pressure on said application valve; a double heading cock of the three position disk type controlling the connection between the application valve and brake pipe and the connection between the automatic actuating means and the application valve and serving to open and close the same substantially simultaneously and when closed serving to admit a controlling pressure to render said application valve inert; a pressure actuated latching means responsive in part to brake pipe pressure, and serving to prevent manipulation of said cock between open and closed position while the brakes are released; and means effective when pressure in the brake system is substantially completely discharged to disengage said latch.

25. The combination of a brake pipe; an application valve of the pressure controlled type connected therewith; automatic actuating means for establishing the controlling pressure on said application valve; and a double heading cock of the three position disk type controlling the connection between the application valve and brake pipe and the connection between the automatic actuating means and the application valve, and serving to open and close the same substantially simultaneously and when closed serving to admit a controlling pressure to render said application valve inert.

CHARLES A. CAMPBELL.